US010817948B2

(12) United States Patent
Dinamani et al.

(10) Patent No.: US 10,817,948 B2
(45) Date of Patent: Oct. 27, 2020

(54) METHOD FOR OPTIMIZING AUTOMATED MANAGEMENT OF THIRD PARTY INSURANCE CLAIM PROCESSING AND DEVICES THEREOF

(71) Applicant: Mitchell International, Inc., San Diego, CA (US)

(72) Inventors: Vidya Dinamani, San Diego, CA (US); Ajit Viswanathan, San Diego, CA (US); William Walker, San Diego, CA (US)

(73) Assignee: Mitchell International, Inc., San Diego, CA (US)

( * ) Notice: Subject to any disclaimer, the term of this patent is extended or adjusted under 35 U.S.C. 154(b) by 369 days.

(21) Appl. No.: 14/630,241

(22) Filed: Feb. 24, 2015

(65) Prior Publication Data

US 2016/0247235 A1  Aug. 25, 2016

(51) Int. Cl.
*G06Q 40/08* (2012.01)
*G06Q 10/10* (2012.01)

(52) U.S. Cl.
CPC ........... *G06Q 40/08* (2013.01); *G06Q 10/10* (2013.01)

(58) Field of Classification Search
CPC ....... G06Q 40/08; G06Q 10/10; G06Q 10/103
USPC ........................................................... 705/4
See application file for complete search history.

(56) References Cited

U.S. PATENT DOCUMENTS

| 2010/0228581 | A1* | 9/2010 | DeFrancesco | G06Q 10/10 705/4 |
| 2012/0130751 | A1* | 5/2012 | McHugh | G06Q 40/08 705/4 |
| 2014/0278582 | A1* | 9/2014 | Shambach | G06Q 40/08 705/4 |
| 2014/0310026 | A1* | 10/2014 | Balthazar | G06Q 40/08 705/4 |

* cited by examiner

*Primary Examiner* — Hao Fu
(74) *Attorney, Agent, or Firm* — Sheppard Mullin Richter & Hampton LLP

(57) ABSTRACT

This technology optimizes management of third party insurance claim processing includes retrieving third party claim data associated with a selected third party claim and from an automatic integration with at least one additional insurance claim application initiated based on the selection of the third party claim. One or more customized claim management operations are executed based on the selected third party claim and at least a portion of the retrieved third party claim data. At least a portion of a customized hierarchical claim management graphical user interface system is generated based on at least a portion of the retrieved third party claim data and the executed one or more customized claim management operations. The customized hierarchical claim management graphical user interface system includes an initial dashboard graphical user interface comprising a plurality of interactive panels and a plurality of specialized third-party claim management graphical user interfaces nested beneath the initial dashboard graphical user interface.

42 Claims, 15 Drawing Sheets

MEDICALS

BILL TABLE

| Provider Name / Bills | Charges | Adjusted | Adjustment Info |
|---|---|---|---|
| Fallbrook Hospital, Inc. (HF) 1769521 | $1,200 | $1,200 | (?) |
| Northpark Associates (GP) 1998336 | $890 | $640 | (?) |
| LaJolla Imaging (DX) 8726651 | $1,200 | $1,000 | (?) |
| Pacific Rehab Inc (PT) 8277862 | $1,200 | $1,000 | (?) |
| SD Chiropractics (CH) 1625699 | $2,300 | $2,000 | (?) |
| Smith Associates (HF) 5745527 | $3,465 | $1,500 | (?) |
| Coastal Clinic Inc. (HF) 983982 | $650 | $400 | (?) |
| | $8,400 | $3,700 | |

METHOD FOR OPTIMIZING AUTOMATED MANAGEMENT OF THIRD PARTY INSURANCE CLAIM PROCESSING AND DEVICES THEREOF

FIELD

This technology relates to methods and devices for optimizing automated management of third party insurance claim processing and devices thereof.

BACKGROUND

Third party insurance claims relate to damage and/or harm to a third party, i.e., someone other than the insured. For example, an insurance claim against an insured driver who negligently caused an auto collision would be a third party claim. Third party insurance claims may include requests for recovery for property and vehicle damage as well as for ongoing medical treatment and pain and suffering over a period of time. While ongoing payments are made directly by the injured party's insurance carrier, when the claim is complete, all recovery is handed over to the insured party's carrier, and typically, resolution of these third party claims is managed by adjusters for the insured party's insurance carrier.

Unfortunately, numerous issues and limitations exist with prior insurance claim management software tools used by these adjusters. For example, these prior insurance claim management software tools often lacked the ability to effectively identify and correlate relevant tools, metrics and/or other rules to manage a very large volume of third party claims simultaneously. Additionally, these prior insurance claim management software tools typically lacked the ability to identify, integrate with, retrieve and then process all of the relevant insurance claim data from different sources, such as relevant benchmark standards, medical notes, claimed amounts, and prior offers and provide a graphical user interface output structure in an organized and meaningful manner. Further, these prior insurance claim management software tool used by these adjusters lacked the programmed functionality to accurately and consistently analyze third party claims, both within their own set of claims, as well as across an entire insurance carrier. As a result, similar types of third party claims often have had slow, different, and inconsistent payouts with these prior insurance claim management software tools.

SUMMARY

A method for optimizing automated management of third party insurance claim processing includes retrieving, by a claim management computing apparatus, third party claim data associated with a selected one of a plurality of third party claims from one or more storage databases and from an automatic integration with at least one additional insurance claim application initiated based on the selection of the one of the plurality of third party claims. One or more customized claim management operations are executed by the claim management computing apparatus based on the selected one of a plurality of third party claims and one or more of at least a portion of the retrieved third party claim data or one or more received data inputs from an adjuster computing device. At least a portion of a customized hierarchical claim management graphical user interface system is generated, by the claim management computing apparatus, based on at least a portion of the retrieved third party claim data and the executed one or more customized claim management operations. The customized hierarchical claim management graphical user interface system includes an initial dashboard graphical user interface comprising a plurality of interactive panels and a plurality of specialized third-party claim management graphical user interfaces nested beneath the initial dashboard graphical user interface. Each of the specialized third-party claim management graphical user interfaces accessible via a received indication of engagement of one of the plurality of interactive panels from an adjuster computing device associated with the selection of the one of the plurality of third party claims. One or more of the initial dashboard graphical user interface and the plurality of specialized third-party claim management graphical user interfaces are configured to be capable of enabling additional execution of one or more of the customized claim management operations utilizing one or more of at least another portion of the retrieved third party claim data or one or more additional received data inputs from the adjuster computing device. Computer executable instructions for the initial dashboard graphical user interface or one of the a plurality of specialized third-party claim management graphical user interfaces nested beneath the initial dashboard graphical user interface are provided by the claim management computing apparatus based on a current request from the adjuster computing device.

A non-transitory computer readable medium having stored thereon instructions for optimizing automated management of third party insurance claim processing comprising executable code which when executed by a processor, causes the processor to perform steps including retrieving third party claim data associated with a selected one of a plurality of third party claims from one or more storage databases and from an automatic integration with at least one additional insurance claim application initiated based on the selection of the one of the plurality of third party claims. One or more customized claim management operations are executed based on the selected one of a plurality of third party claims and one or more of at least a portion of the retrieved third party claim data or one or more received data inputs from an adjuster computing device. At least a portion of a customized hierarchical claim management graphical user interface system is generated based on at least a portion of the retrieved third party claim data and the executed one or more customized claim management operations. The customized hierarchical claim management graphical user interface system includes an initial dashboard graphical user interface comprising a plurality of interactive panels and a plurality of specialized third-party claim management graphical user interfaces nested beneath the initial dashboard graphical user interface. Each of the specialized third-party claim management graphical user interfaces accessible via a received indication of engagement of one of the plurality of interactive panels from an adjuster computing device associated with the selection of the one of the plurality of third party claims. One or more of the initial dashboard graphical user interface and the plurality of specialized third-party claim management graphical user interfaces are configured to be capable of enabling additional execution of one or more of the customized claim management operations utilizing one or more of at least another portion of the retrieved third party claim data or one or more additional received data inputs from the adjuster computing device. Computer executable instructions for the initial dashboard graphical user interface or one of the a plurality of specialized third-party claim management graphical user interfaces nested beneath the initial dashboard graphical user interface are provided based on a current request from the adjuster computing device.

A claim management computing apparatus includes a memory coupled to a processor which is configured to be capable of executing programmed instructions comprising and stored in the memory to retrieve third party claim data associated with a selected one of a plurality of third party claims from one or more storage databases and from an automatic integration with at least one additional insurance claim application initiated based on the selection of the one of the plurality of third party claims. One or more customized claim management operations are executed based on the selected one of a plurality of third party claims and one or more of at least a portion of the retrieved third party claim data or one or more received data inputs from an adjuster computing device. At least a portion of a customized hierarchical claim management graphical user interface system is generated based on at least a portion of the retrieved third party claim data and the executed one or more customized claim management operations. The customized hierarchical claim management graphical user interface system includes an initial dashboard graphical user interface comprising a plurality of interactive panels and a plurality of specialized third-party claim management graphical user interfaces nested beneath the initial dashboard graphical user interface. Each of the specialized third-party claim management graphical user interfaces accessible via a received indication of engagement of one of the plurality of interactive panels from an adjuster computing device associated with the selection of the one of the plurality of third party claims. One or more of the initial dashboard graphical user interface and the plurality of specialized third-party claim management graphical user interfaces are configured to be capable of enabling additional execution of one or more of the customized claim management operations utilizing one or more of at least another portion of the retrieved third party claim data or one or more additional received data inputs from the adjuster computing device. Computer executable instructions for the initial dashboard graphical user interface or one of the a plurality of specialized third-party claim management graphical user interfaces nested beneath the initial dashboard graphical user interface are provided based on a current request from the adjuster computing device.

This technology provides a number of advantages including providing more effective methods, non-transitory computer readable medium and apparatuses for improving the functioning of a claim management computing device to optimize management of third party insurance claim processing. With this technology, the functioning of the claim management computing device is improved by the automatic integration with at least one additional insurance claim application to assist in the retrieval of third party claim data. Additionally, the functioning of the claim management computing device is improved by the generation of a customizable hierarchical claim management graphical user interface system. Further, the functioning of the claim management computing device is improved by identifying and enabling automatic execution of one or more customized claim management operations to further update and/or customize the hierarchical claim management graphical user interface system.

With this customized hierarchical claim management graphical user interface system, a current status of the third party claims, past inputs, past notes as well as various interactive comparative metrics related to existing third party insurance claims can be quickly generated and displayed at various different levels which enables more efficient, effective, and consistent management of third party insurance claims. Further, this technology centralizes recordation of inputs to and a status of various aspects related to the management of existing third party insurance claims at various levels that enhances third party claims processing.

BRIEF DESCRIPTION OF THE DRAWINGS

FIG. 4 is a screenshot of an example of a customized graphical user interface with a requested list of third party claims;

FIG. 9 is a screenshot of an example of a sub-specialized third-party claim management graphical user interface for bill reports;

FIG. 10 is a screenshot of an example of a sub-specialized third-party claim management graphical user interface for a summary of medical charges per facility;

FIG. 11 is a screenshot of an example of a sub-specialized third-party claim management graphical user interface for an interactive treatment slider based on expected recovery date;

FIG. 13 is a screenshot of an example of a sub-specialized third-party claim management graphical user interface for a negotiation worksheet; and FIG. 14 is a screenshot of an example of a sub-specialized third-party claim management graphical user interface for levels of negotiation for medical entries.

DETAILED DESCRIPTION

Figure 1:
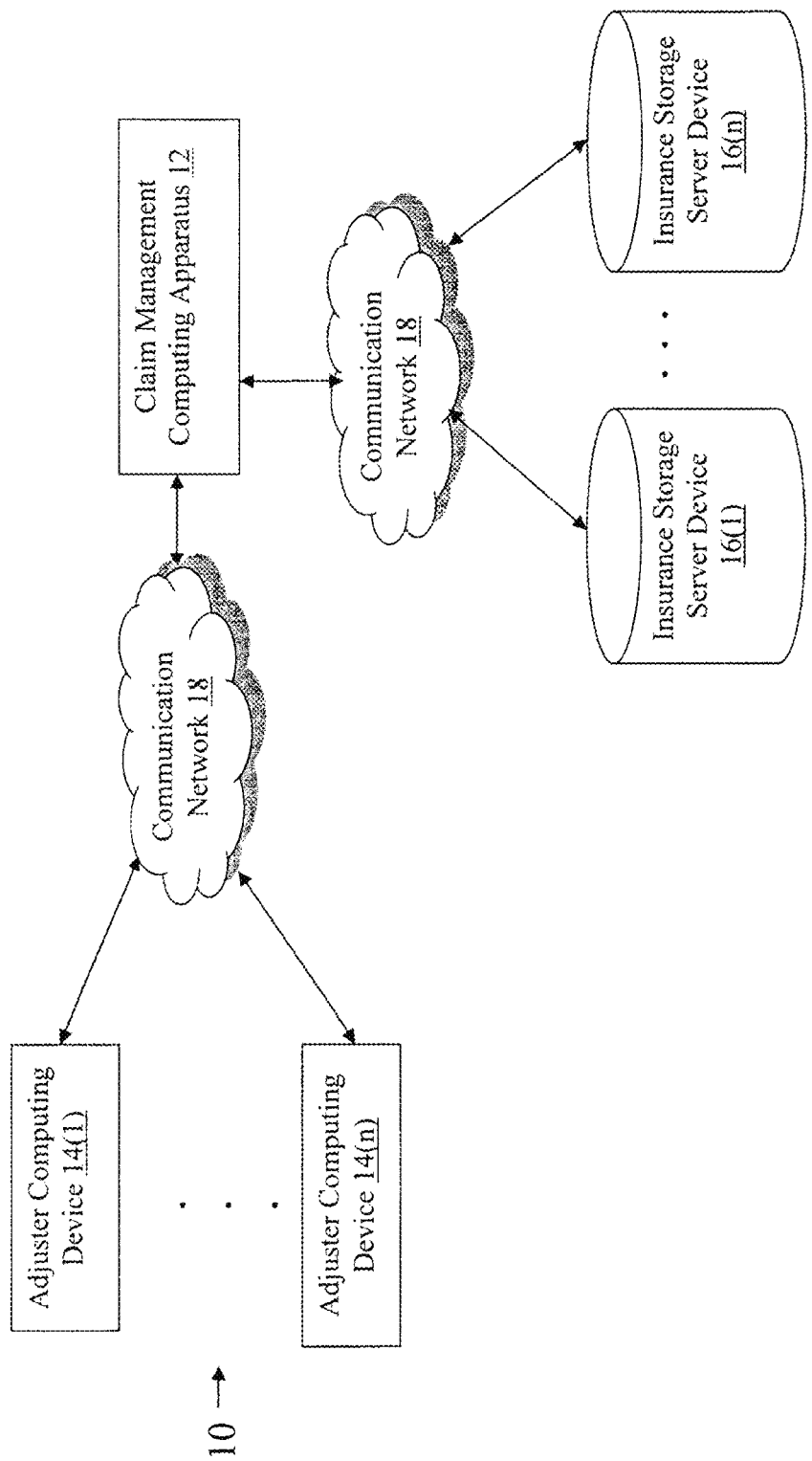
FIG. 1 is a block diagram of an environment with an example of an claim management computing apparatus that optimizes management of third party insurance claim processing.
Figure 2:
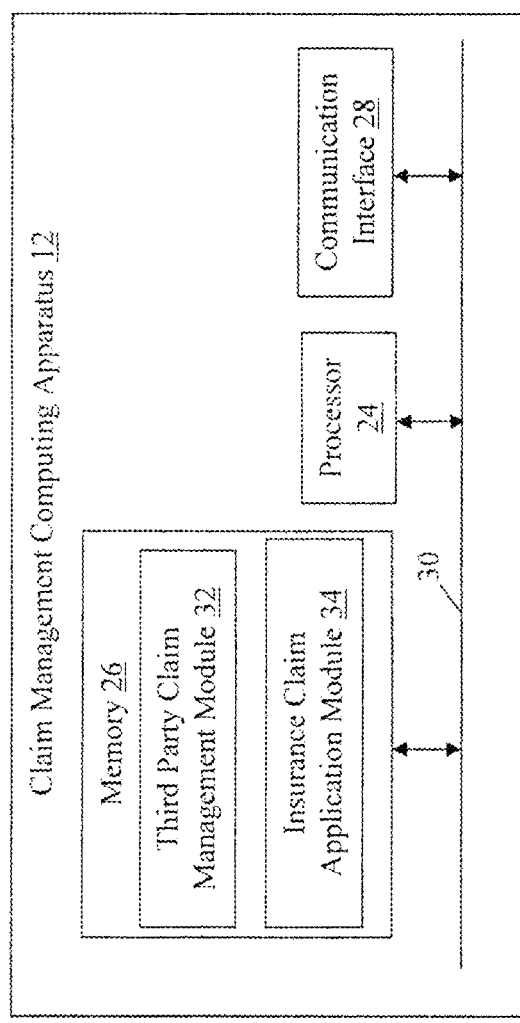
FIG. 2 is a block diagram of the example of the claim management computing apparatus shown in FIG. 1.

An environment 10 with exemplary claim management computing apparatus 12 is illustrated in FIGS. 1-2. In this particular example, the environment 10 includes the claim management computing apparatus 12, adjuster computing devices 14(1)-14(n), and storage server devices 16(1)-16(n) coupled via one or more communication networks 18, although the environment could include other types and numbers of systems, devices, components, and/or other elements as is generally known in the art and will not be illustrated or described herein. This technology provides a number of advantages including providing methods, non-transitory computer readable medium, and apparatuses for improving the functioning of a claim management computing device to optimize management of third party insurance claim processing.

Referring more specifically to FIGS. 1-2, the claim management computing apparatus 12 optimizes management of third party insurance claim processing, although the apparatus can perform other types and/or numbers of functions or other operations and this technology can be utilized with other types of claims. In this particular example, the claim management computing apparatus 12 includes a processor 24, a memory 26, and a communication interface 28 which are coupled together by a bus 30, although the claim management computing apparatus 12 may include other types and/or numbers of physical and/or virtual systems, devices, components, and/or other elements in other configurations.

The processor 24 of in the claim management computing apparatus 12 may execute one or more programmed instructions stored in the memory 26 improving the functioning of a claim management computing device to optimize management of third party insurance claim processing as illustrated and described in the examples herein, although other types and numbers of functions and/or other operation can be performed. The processor 24 of in the claim management computing apparatus 12 may include one or more central processing units and/or general purpose processors with one or more processing cores, for example.

The memory 26 of in the claim management computing apparatus 12 stores the programmed instructions and other data for one or more aspects of the present technology as described and illustrated herein, although some or all of the programmed instructions could be stored and executed elsewhere. A variety of different types of memory storage devices, such as a random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor 24, can be used for the memory 26. In this particular example, the memory 26 includes a third party claim management module 32 and an insurance claim application module 34, although the memory 26 can comprise other types and/or numbers of other modules, programmed instructions and/or data. The instructions and steps of the third party claim management module 32 are illustrated and described by way of the examples herein. A variety of different types and numbers of insurance claim applications can comprise module 34, such as non-transitory computer readable instructions for a medical claim processing application by way of example only.

The communication interface 28 of in the claim management computing apparatus 12 operatively couples and communicates between one or more of the adjuster computing devices 14(1)-14(n) and one or more of the storage server devices 16(1)-16(n), which are all coupled together by one or more of the communication networks 18, although other types and numbers of communication networks or systems with other types and numbers of connections and configurations to other devices and elements. By way of example only, the communication networks 18 can use TCP/IP over Ethernet and industry-standard protocols, including NFS, CIFS, SOAP, XML, LDAP, SCSI, and SNMP, although other types and numbers of communication networks, can be used. The communication networks 18 in this example may employ any suitable interface mechanisms and network communication technologies, including, for example, any local area network, any wide area network (e.g., Internet), teletraffic in any suitable form (e.g., voice, modem, and the like), Public Switched Telephone Network (PSTNs), Ethernet-based Packet Data Networks (PDNs), and any combinations thereof and the like.

In this particular example, each of the adjuster computing devices 14(1)-14(n) may run applications that may provide an interface to make requests for and receive responses from the claim management computing apparatus 12 relating to management of third party insurance claims or other types of claims.

The storage server devices 16(1)-16(n) may store and provide content or other network resources which are related to a particular insurance carrier and/or multiple or all insurance carriers in response to processing and responding to requests from the adjuster computing devices 14(1)-14(n) via one or more of the communication networks 18, for example, although other types and numbers of storage media in other configurations could be used. In particular, the storage server devices 16(1)-16(n) may each comprise various combinations and types of storage hardware and/or software and represent a system with multiple network server devices in a data storage pool, which may include internal or external networks. Various network processing applications, such as CIFS applications, NFS applications, HTTP Web Network server device applications, and/or FTP applications, may be operating on the storage server devices 16(1)-16(n) and transmitting data (e.g., files or web pages) in response to requests from the adjuster computing devices 14(1)-14(n)

Each of the adjuster computing devices 14(1)-14(n) and each of the storage server devices 16(1)-16(n) may include a processor, a memory, and a communication interface, which are coupled together by a bus or other link, although other numbers and types of devices and/or nodes as well as other network elements could be used.

Although the exemplary network environment 10 with the claim management computing apparatus 12, the adjuster computing devices 14(1)-14(n), the storage server devices 16(1)-16(n), and the communication networks 18 are described and illustrated herein, other types and numbers of systems, devices, components, and elements in other topologies can be used. It is to be understood that the systems of the examples described herein are for exemplary purposes, as many variations of the specific hardware and software used to implement the examples are possible, as will be appreciated by those skilled in the relevant art(s).

In addition, two or more computing systems or devices can be substituted for any one of the systems or devices in any example. Accordingly, principles and advantages of distributed processing, such as redundancy and replication also can be implemented, as desired, to increase the robustness and performance of the devices, apparatuses, and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples also may be embodied as a non-transitory computer readable medium having instructions stored thereon for one or more aspects of the present technology as described and illustrated by way of the examples herein, as described herein, which when executed by the processor, cause the processor to carry out the steps necessary to implement the methods of this technology as described and illustrated with the examples herein.

Figure 3:
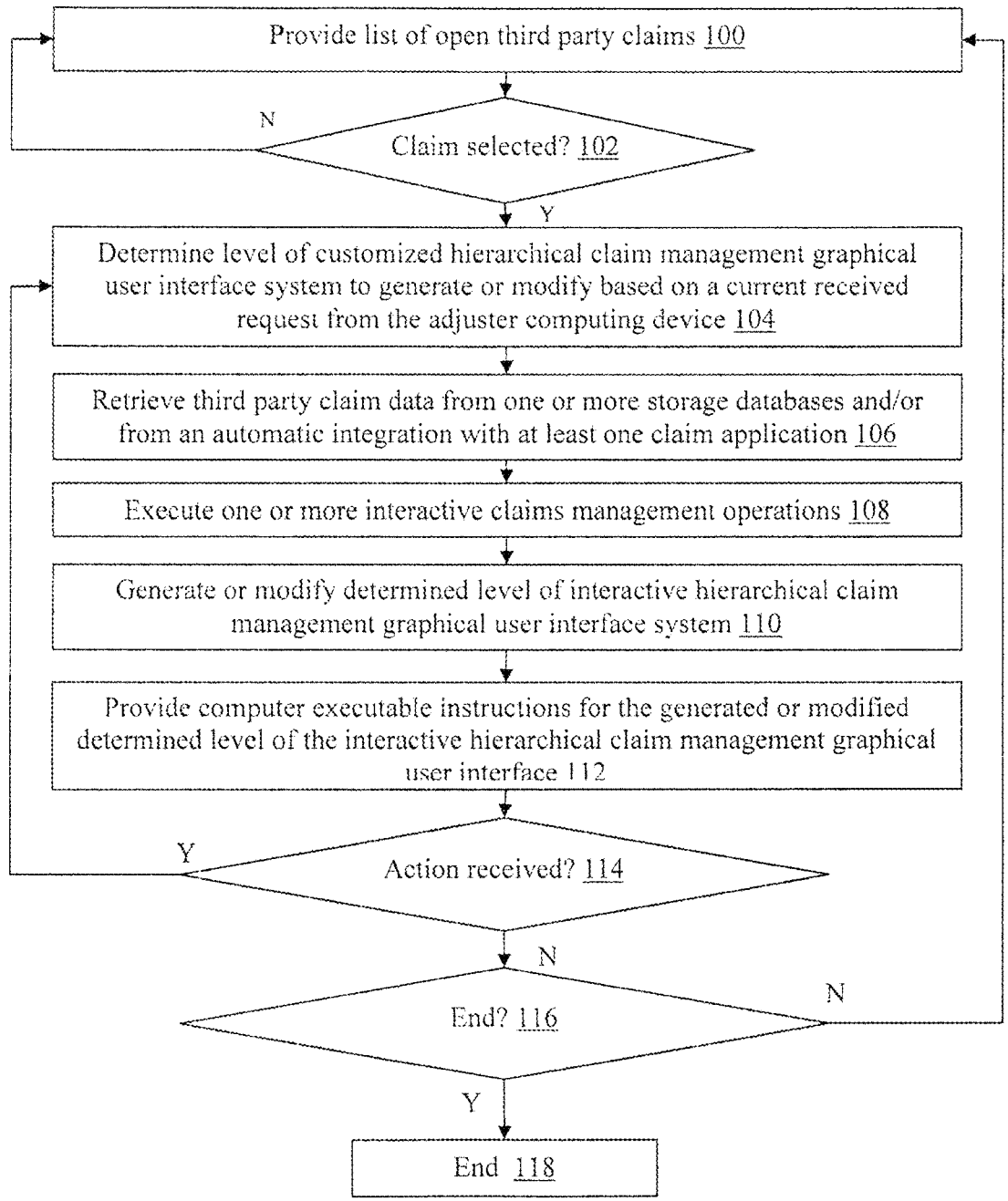
FIG. 3 is a flow chart of an example of a method for optimizing automated management of third party insurance claim processing.

An example of a method for optimizing automated management of third party insurance claim processing will now be described with reference to FIGS. 1-14. Referring more specifically to FIG. 3, in this example in step 100, the claim management computing apparatus 12 in response to a request from one of the adjuster computing devices 14(1)-14(n), retrieves data on one or more third party claims based on one or more parameters in the request, such as claim status or claims assigned to a particular adjuster way of example only, although other types and/or numbers of parameters could be used.

Figure 4:
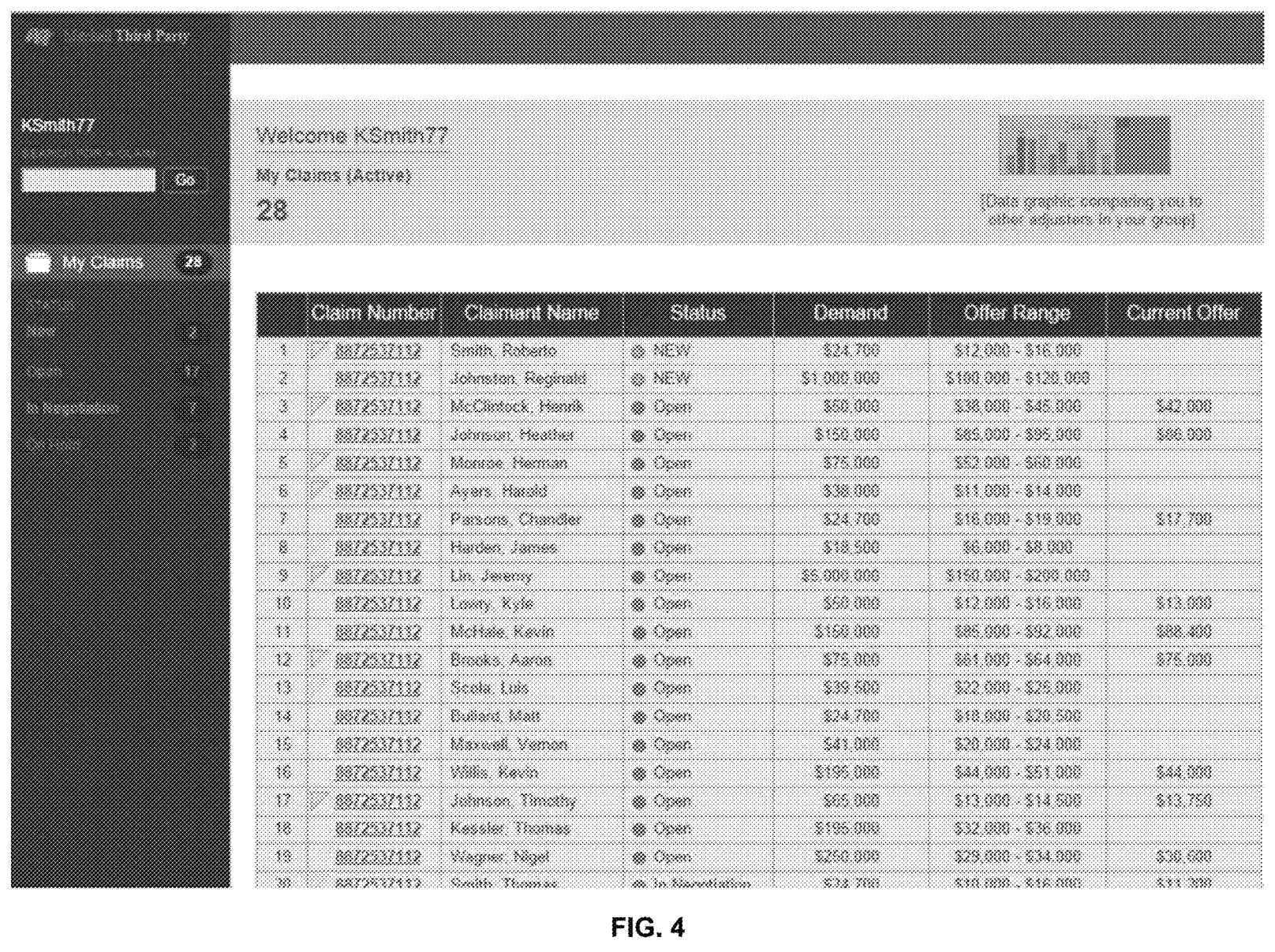

Next, the claim management computing apparatus 12 generates based on the retrieved data and provides computer executable instructions for an customized graphical user interface with a list of third party claims to the requesting one of the adjuster computing devices 14(1)-14(n), although the third party claims could be provided in other manners to other types and/or numbers of systems, devices, components or other elements. By way of example only, a screen shot of the graphical user interface with the list of third party claims is illustrated in FIG. 4. In this example, the list of third party claims includes a sequential listing of third party claims with corresponding data in columns including a claim number, claimant name, claim status, demand, offer range, and current offer, although other types and/or numbers of columns could be used.

In step 102, the claim management computing apparatus 12 determines when a selection of one of the third party claims from the list is received from the requesting one of the adjuster computing devices 14(1)-14(n), although other types and/or numbers of other systems, devices, components or other elements could select one of the third party claims and in other manners. If in step 102 the claim management computing apparatus 12 determines a selection of one of the third party claims from the list has not been received from the requesting one of the adjuster computing devices 14(1)-14(n), then the No branch is taken back to step 100 as described earlier. If in step 102 the claim management computing apparatus 12 determines a selection of one of the third party claims from the list has been received from the requesting one of the adjuster computing devices 14(1)-14(n), then the Yes branch is taken to step 104.

In step 104, the claim management computing apparatus 12 determine a level of a customized hierarchical claim management graphical user interface system to generate or modify system based on a current received request from the requesting one of the adjuster computing devices 14(1)-14(n). In response to the current received request that is an initial request from the requesting one of the adjuster computing devices 14(1)-14(n) for a selected one of the third party claims, the claim management computing apparatus 12 would determine that an initial dashboard graphical user interface comprising a plurality of interactive panels would need to be generated, such as the one illustrated in FIG. 5A by way of example only, although the claim management computing apparatus 12 could make other determinations. For example, if the current received request was a modification request of the initial dashboard graphical user interface or request for one of the plurality of interactive panels, then the claim management computing apparatus 12 would determine that either a modified dashboard graphical user interface, such as the one illustrated in FIG. 5B, or one of a plurality of specialized third-party claim management graphical user interfaces, such as the ones illustrated in FIGS. 6-8 by way of example only, nested beneath the initial dashboard graphical user interface need to be generated. Further, the claim management computing apparatus 12 may determine other types and/or numbers of further sub-specialized claim management graphical user interfaces, such as the ones illustrated in FIGS. 9-14 by way of example only, one or more levels below the one of the plurality of specialized third-party claim management graphical user interfaces need to be generated by way of example.

In step 106, based on the current hierarchical level of the customized hierarchical claim management graphical user interface system and the current request, the claim management computing apparatus 12 may retrieve stored third party claim data from one or more insurance storage server devices 16(1)-16(n), although the third party claim data can be retrieved from other types and/or numbers of other systems, devices, components, and/or other elements. By way of example only, this third party claim data may comprise stored data on other third party claims assigned to a particular entity, the current demand, offer range, current offer, insured contact information, claimant contact information, attorney contact information, a claim map, and/or diary notes, although other types and/or amounts of other data may be stored for quick retrieval for use in the customized hierarchical claim management graphical user interface system.

Additionally, based on the current hierarchical level of the customized hierarchical claim management graphical user interface system and the current request, the claim management computing apparatus 12 may automatically identify, select and integrate into one or more insurance claim applications internal and/or external to an insurance carrier, such as the medical claim processing application in the insurance claim application module 34 by way of example only, based on one or more parameters related to the selected one of the third party claims, such as the claim type by way of example only, although other types and/or numbers of other applications may be automatically identified, selected and integrated in other manners. By way of example only, the claim management computing apparatus 12 may store one or more tables or other data to correlate the particular third party claims and/or the requesting entity to one or more insurance claim applications internal and/or external to an insurance carrier along with executable instructions for obtaining and securely connecting to the identified one or more insurance claim applications for the automated integration, although other approaches for this integration could be used. With this integration, the functioning of the claim management computing apparatus 12 is improved by more efficiently identifying and utilizing related claim applications to facilitate process of the selected third party insurance claim which was deficient in prior software tools, although again this technology can be utilized with other types of claims.

Figure 9:
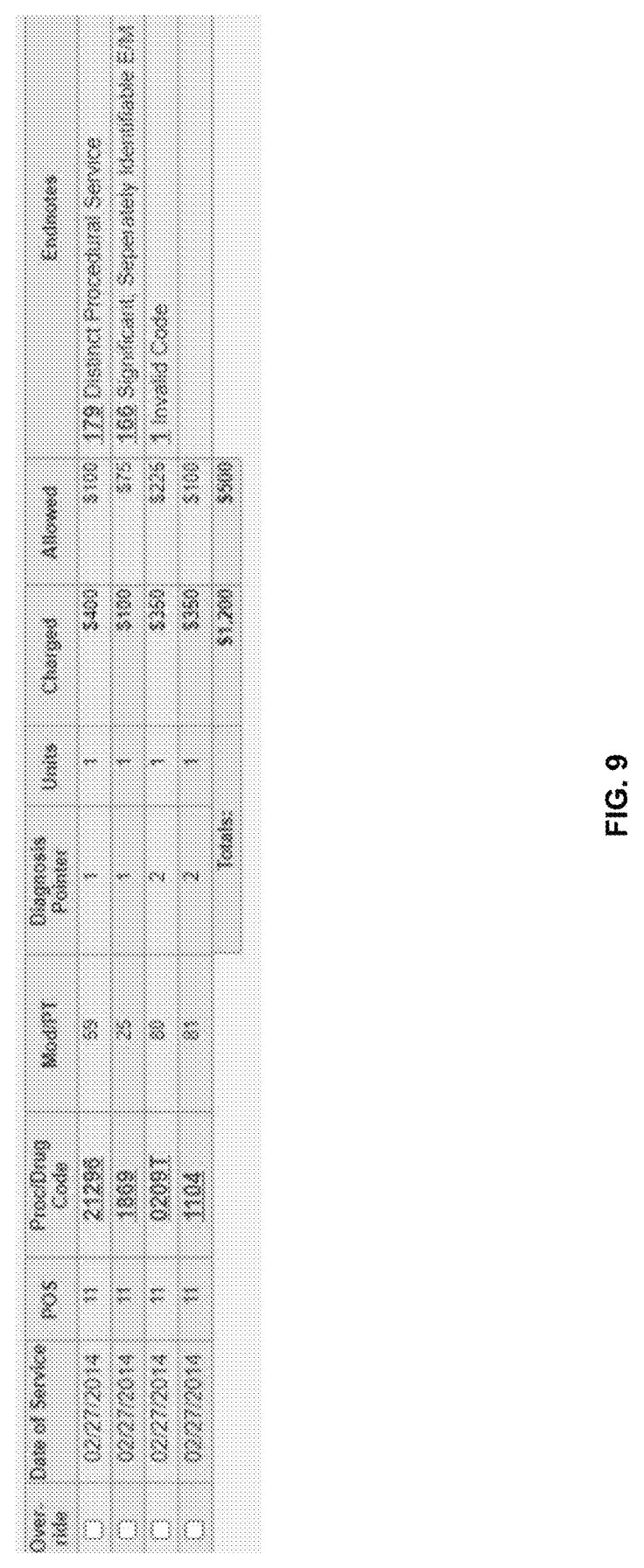
Figure 11:
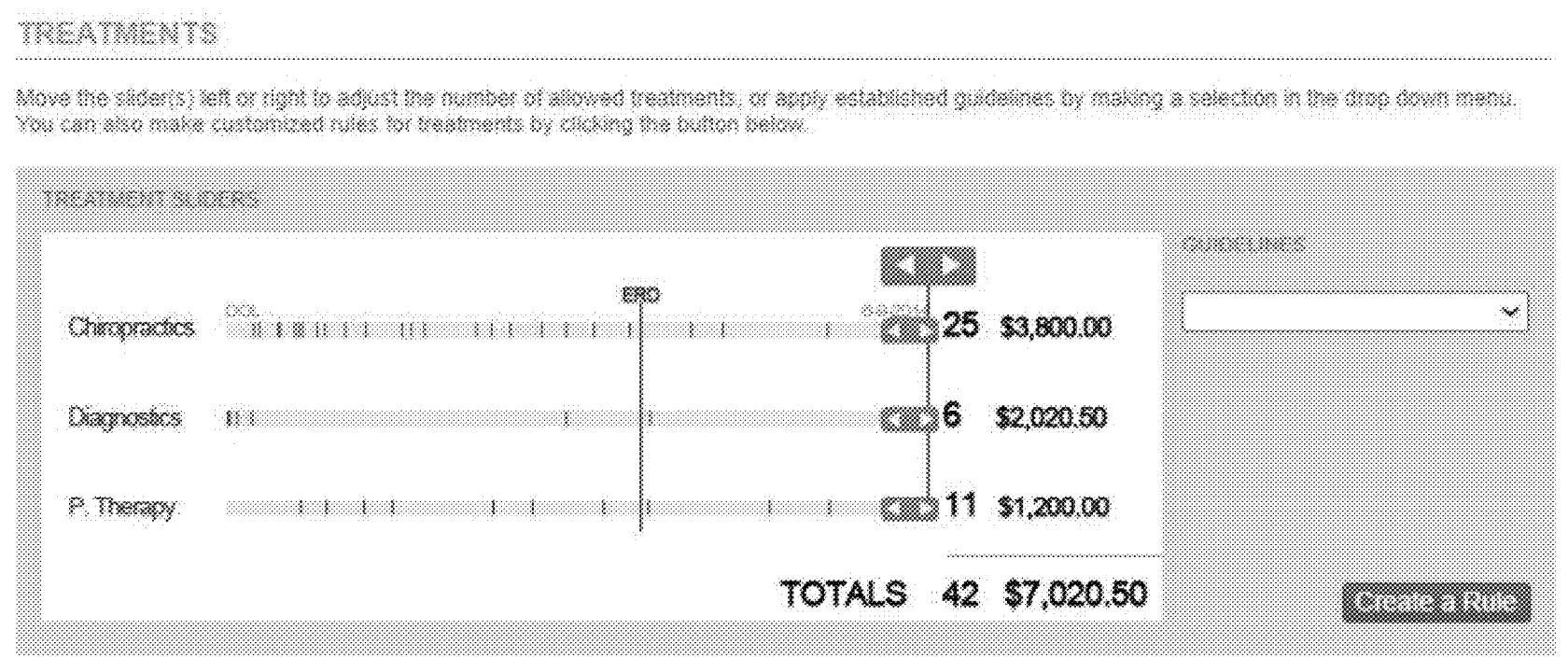
Figure 12:
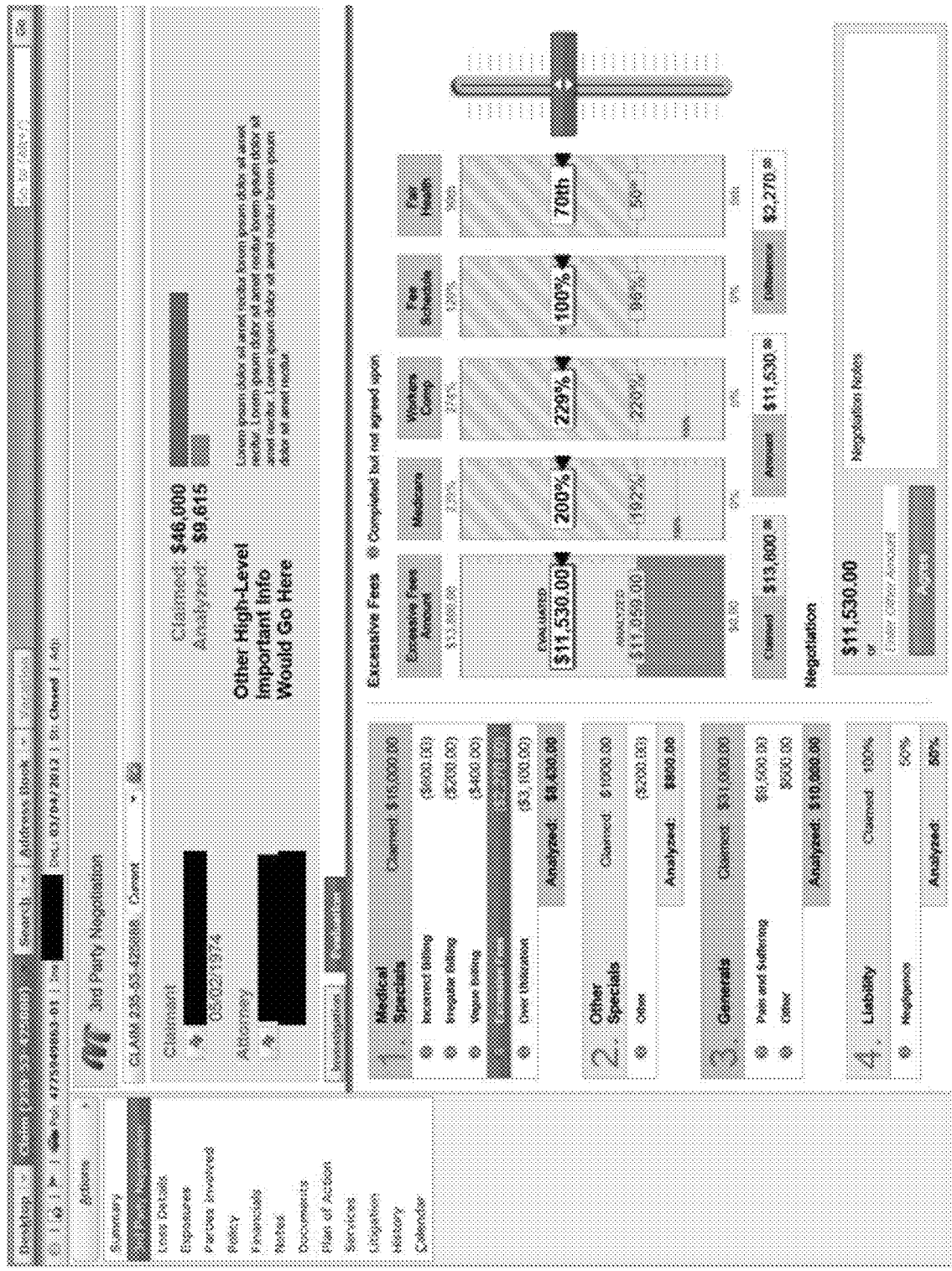
FIG. 12 is a screenshot of an example of a sub-specialized third-party claim management graphical user interface for an interactive current demand slider against benchmarks.
Figure 13:
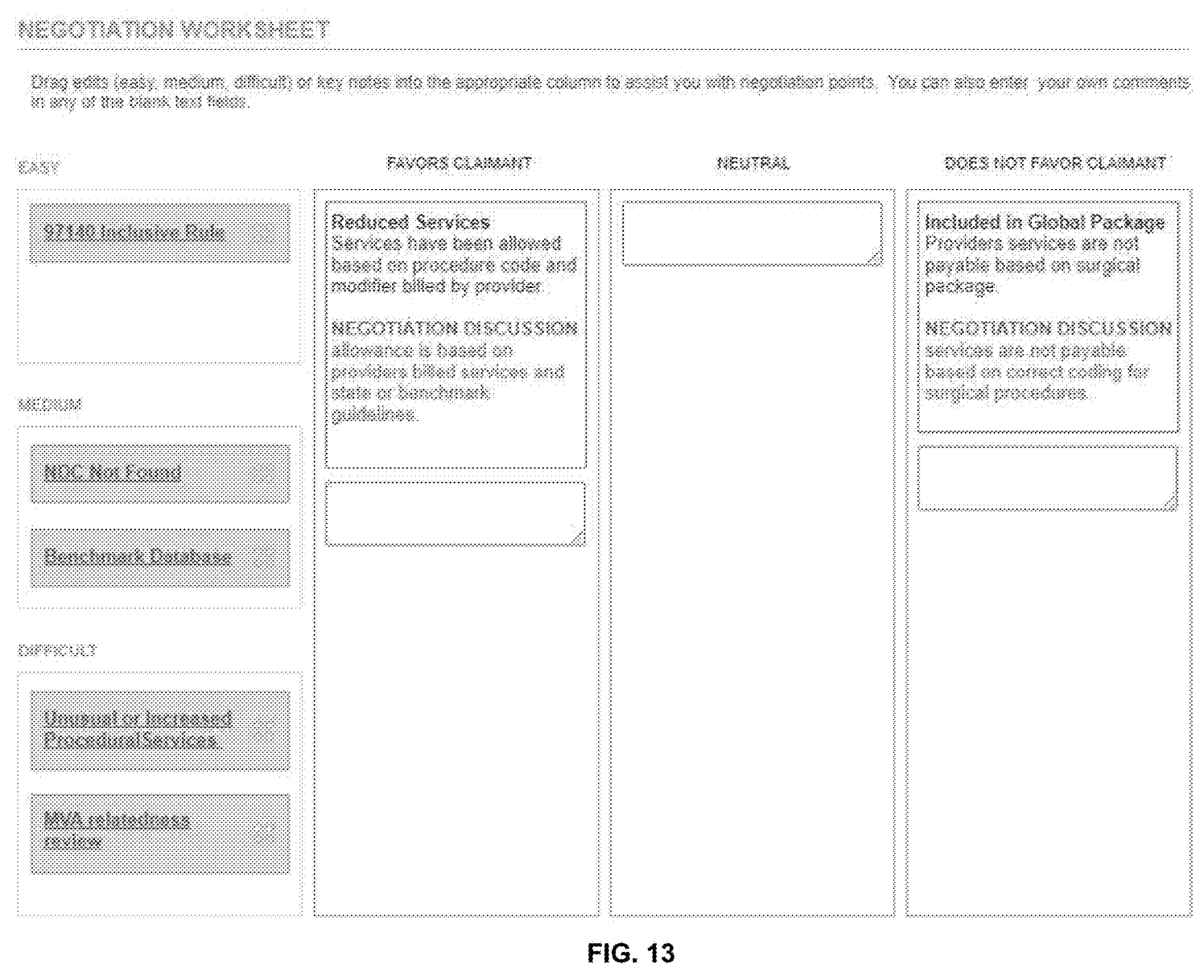

In step 108, the claim management computing apparatus 12 may execute one or more claim management operations to assist with the generation of the graphical user interface for the current level of the customized hierarchical claim management graphical user interface system based on one or more received data inputs from the requesting one of the adjuster computing devices 14(1)-14(n), although the execution may be initiated in other manners. By way of example only, one claim management operation which might be executed by the claim management computing apparatus 12 is an update operation for the initial dashboard graphical user interface based on the selection of a different snapshot as illustrated by way of example in FIG. 5B. Another example of a claim management operation which might be executed by the claim management computing apparatus 12 is an execution of one or more override payments based on one or more received data inputs from the requesting one to the adjuster computing devices 14(1)-14(n) as illustrated in FIG. 9. Another example of a claim management operation which might be executed by the claim management computing apparatus 12 is a calculation of a summary of current charges from each medical facility for the selected one of the third party claims as illustrated in FIG. 10. Another example of a claim management operation which might be executed by the claim management computing apparatus 12 is a generation of a graphical user interface with individual and overall interactive treatment sliders based on expected recovery date along a timeline of one or more treatments associated with the selected one of the third party claims, such as chiropractic, diagnostic and physical therapy by way of example only, and providing calculated actual charged amounts for each treatment based on the adjusted position of the treatment sliders as illustrated in FIG. 11. Another example of a claim management operation which might be executed by the claim management computing apparatus 12 is a generation of a graphical user interface with an interactive adjustable current demand slider against benchmarks and providing calculated percentages with respect to the benchmarks as illustrated in FIG. 12. Additionally, in the example illustrated in FIG. 12 another claim management operation which might be executed by the claim management computing apparatus 12 is an incorporation of other benchmarks or guidelines based on one or more received data inputs from the requesting one of the adjuster computing devices 14(1)-14(n) and mining and analysis of related data to update the graphical user interface. Another example of a claim management operation which might be executed by the claim management computing apparatus 12 is a generation of an interactive negotiation worksheet which allows negotiation points to be moved into favorable and/or unfavorable areas to facilitate processing and ultimately, negotiation of the selected third party claim as illustrated in FIG. 13. Another example of a claim management operation which might be executed by the claim management computing apparatus 12 is a generation of interactive levels of negotiation for medical entries which can be easily re-categorized based on one or more received data inputs from the requesting one of the adjuster computing devices 14(1)-14(n) as illustrated in FIG. 14. Although examples of claim management operations which may be executed by the claim management computing apparatus 12 are illustrated and described above, other types and/or numbers of other operations could be implemented.

Figure 5A:
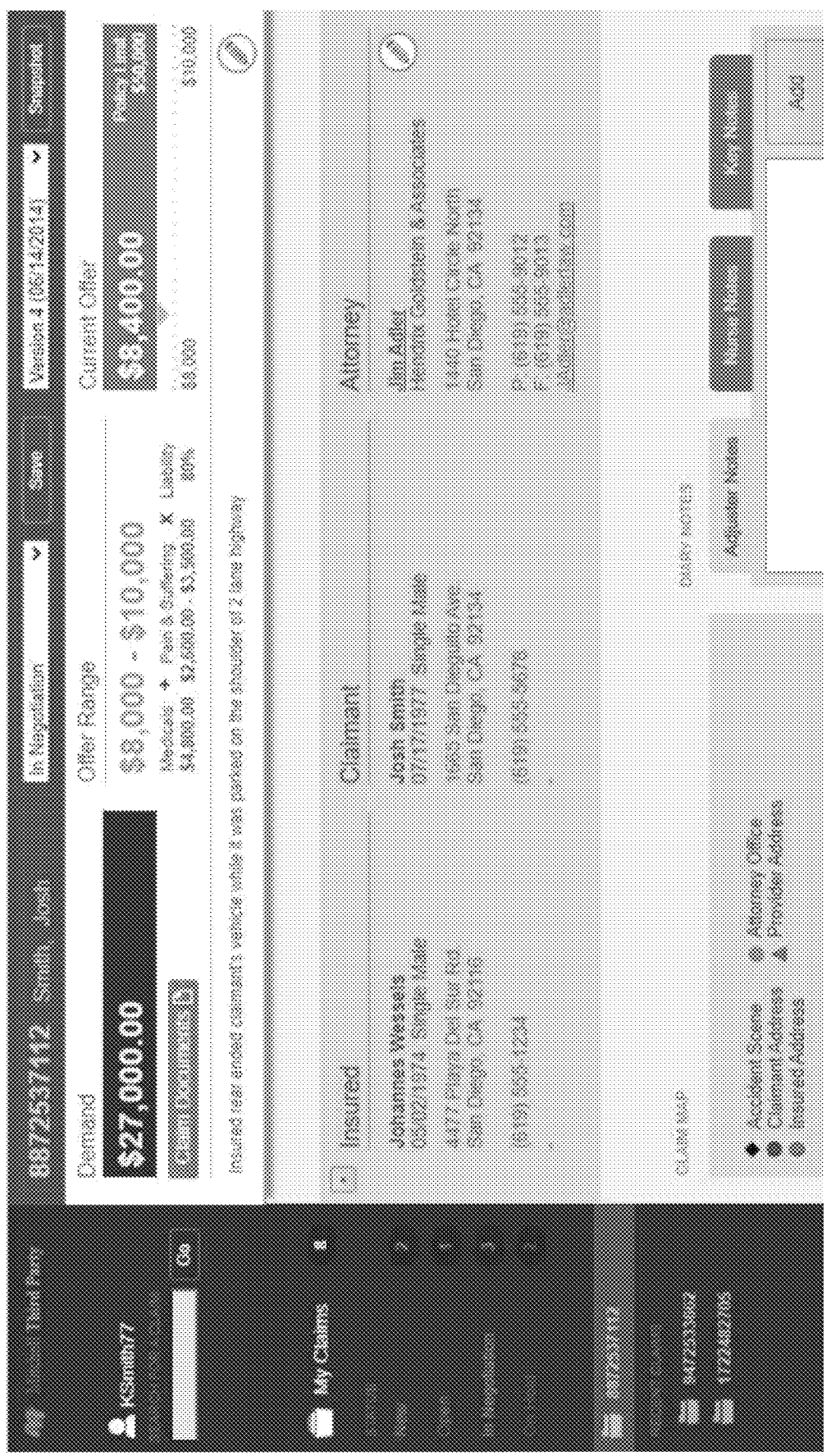
FIG. 5A is a screenshot of an example of a initial dashboard graphical user interface comprising a plurality of interactive panels.
Figure 5B:
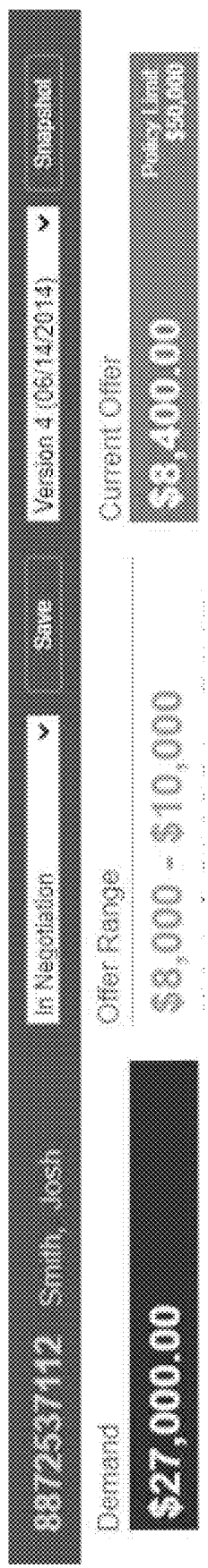
FIG. 5B is a screenshot of another example of a portion of the initial dashboard graphical user interface showing a potential modification to a selected snapshot.
Figure 6:
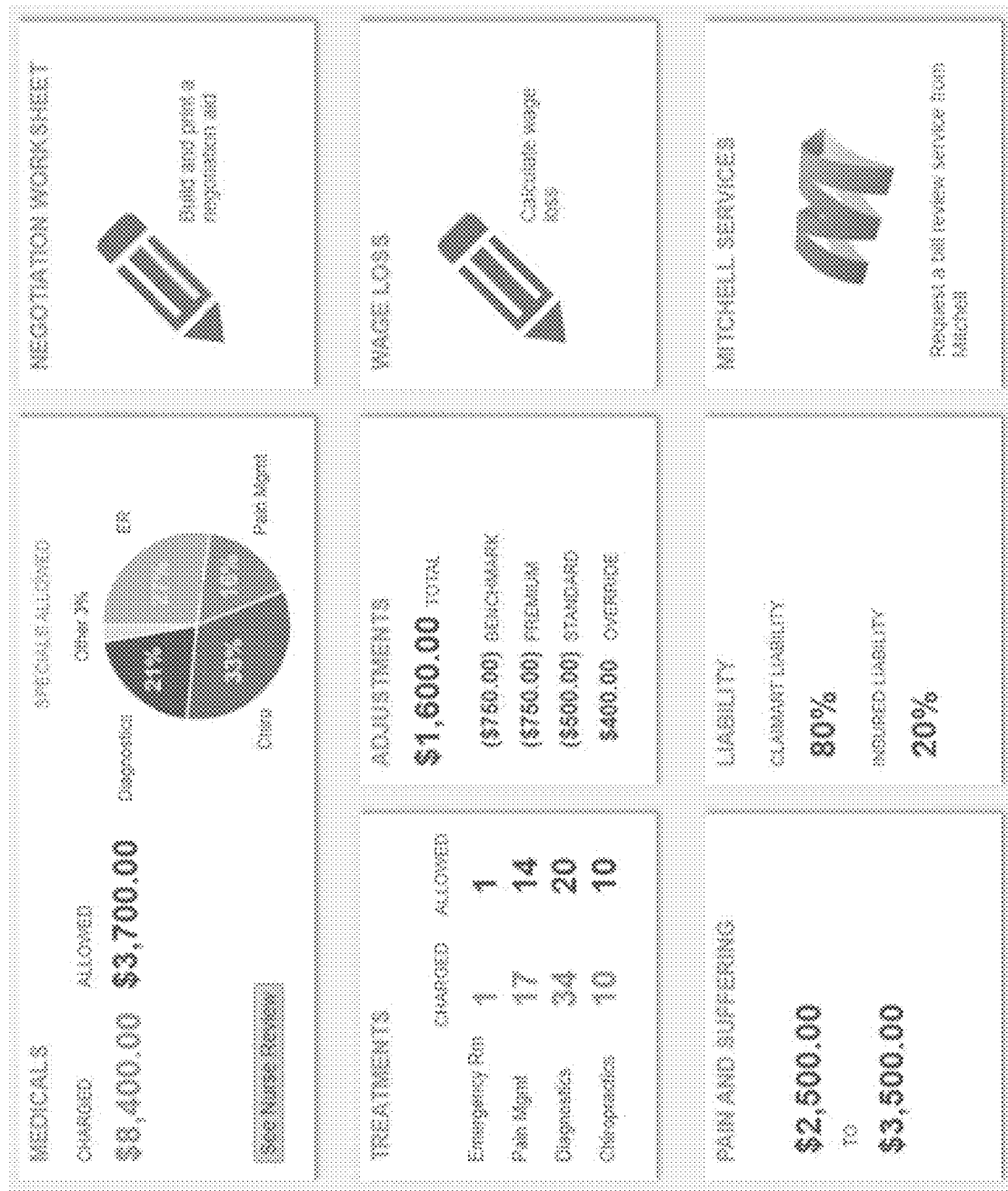
FIG. 6 is a screenshot of an example of a specialized third-party claim management graphical user interface for a monetary overview interactive panel.
Figure 7:
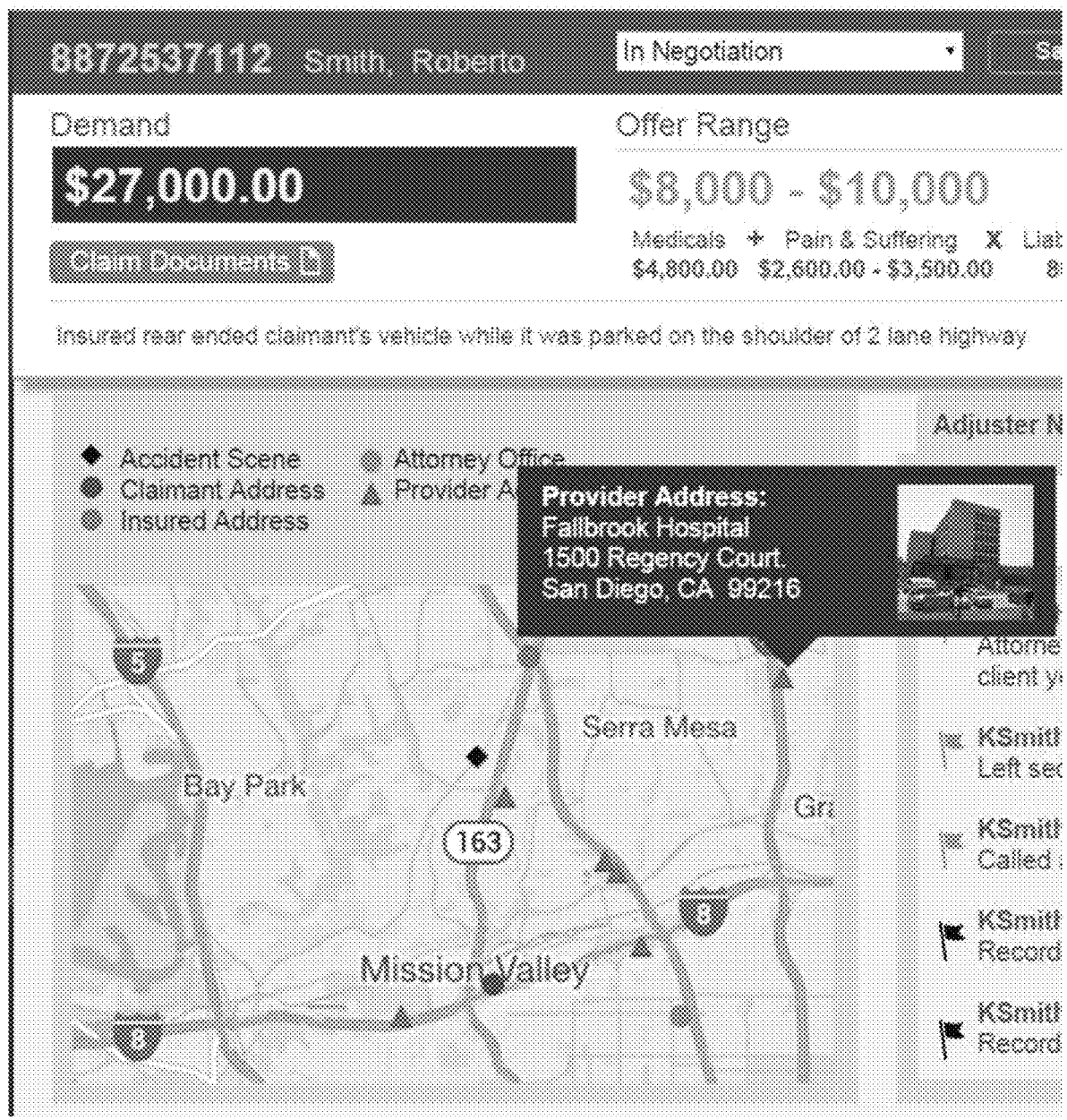
FIG. 7 is a screenshot of an example of a specialized third-party claim management graphical user interface for a claim map interactive panel.
Figure 8:
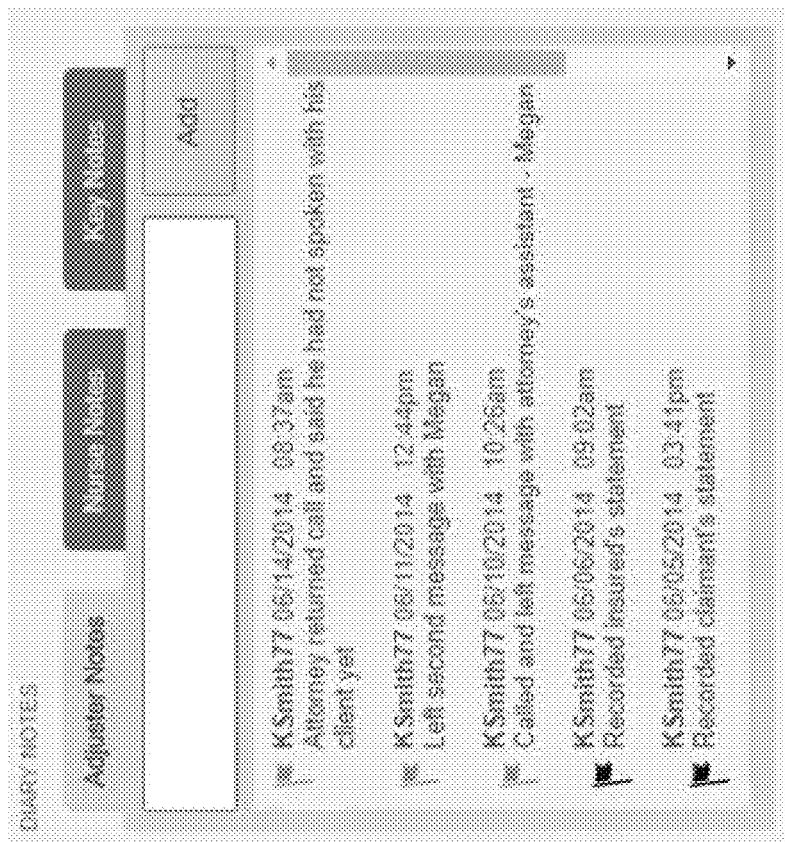
FIG. 8 is a screenshot of an example of a specialized third-party claim management graphical user interface for a diary notes interactive panel.

In step 110, the claim management computing apparatus 12 generates or modifies the graphical user interface based on the current level of the customized hierarchical claim management graphical user interface system based on the processing executed in steps 104, 106 and 108 which was deficient in prior software tools, although other types and/or numbers of other operations or functions to generate or modify the current level of the graphical user interface for the customized hierarchical claim management graphical user interface system could be executed. By way of example only, the claim management computing apparatus 12 may generate the initial dashboard graphical user interface comprising a plurality of interactive panels, such as the adjuster case panel on the left side, the monetary panel along the top, the contact information panel in the middle, or the claim map panel and diary note panel along the bottom as illustrated in FIG. 5A, although other types and/or numbers of other interactive panels in other configurations could be used. In another example, the claim management computing apparatus 12 may modify the initial dashboard graphical user interface based on a received data input from the requesting one of the adjuster computing devices 14(1)-14(n) resulting in the modified dashboard graphical user interface illustrated in FIG. 5B, although other graphical user interfaces in the customized hierarchical claim management graphical user interface system could also be modified. In another example, the claim management computing apparatus 12 may generate a graphical user interface for one of a plurality of specialized third-party claim management graphical user interfaces, such as the ones illustrated in FIGS. 6-8. In another example, the claim management computing apparatus 12 may generate a graphical user interface for one of a plurality of sub-specialized third-party claim management graphical user interfaces, such as the ones illustrated in FIGS. 9-14. Additionally, further sub-levels of the customized hierarchical claim management graphical user interface system not illustrated may be generated. Further, the claim management computing apparatus 12 during the execution of the steps illustrated and described herein stores retrieved and input data as well as all calculations during this process as snapshots which can be selected and retrieved as illustrated and described with reference to FIGS. 5A and 5B, although other manners for capturing the status of third party claim processing at different times could be used.

In step 112, the claim management computing apparatus 12 provides the generated or modified graphical user interface based on the current level of the customized hierarchical claim management graphical user interface system to the requesting one of the adjuster computing devices 14(1)-14(n).

In step 114, the claim management computing apparatus 12 determines whether any action in a received data input from one of the adjuster computing devices 14(1)-14(n) regarding the current level of the customized hierarchical claim management graphical user interface system is received. If in step 114 the claim management computing apparatus 12 determines an action in a received data input from one of the adjuster computing devices 14(1)-14(n) regarding the current level of the customized hierarchical claim management graphical user interface system has been received, then the Yes branch is taken back to step 104 earlier. If in step 114 the claim management computing apparatus 12 determines an action in a received data input from one of the adjuster computing devices 14(1)-14(n) regarding the current level of the customized hierarchical claim management graphical user interface system has not been received, then the No branch is taken back to step 116.

In step 116, the claim management computing apparatus 12 determines whether processing third party claims has ended. If in step 116, the claim management computing apparatus 12 determines further processing of third party claim has not ended, then the No branch is taken back to step 100. If in step 116, the claim management computing apparatus 12 determines further processing of third party claim has ended, then the Yes branch is taken back to step 118 where this example ends.

Accordingly, as described and illustrated by way of the description and examples herein, this technology provides methods, non-transitory computer readable medium and apparatuses for improving the functioning of a claim management computing device to optimize management of third party insurance claim processing with a customized hierarchical claim management graphical user interface system.

With this customized hierarchical claim management graphical user interface system, a current status of the third party claims, past inputs, past notes as well as various interactive comparative metrics related to existing third party insurance claims can be quickly generated and displayed at various different levels which enables more efficient, effective, and consistent management of third party insurance claims. Further, this technology centralizes recordation of inputs to and a status of various aspects related to the management of existing third party insurance claims at various levels that enhances third party claims processing.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method comprising:
    retrieving, by a computing apparatus, claim data associated with one of a plurality of claims from one or more storage databases;
    customizing, by the computing apparatus, a configuration of at least a portion of a hierarchical claim management graphical user interface system comprising an initial dashboard graphical user interface comprising a plurality of interactive panels and a plurality of specialized third-party claim management graphical user interfaces nested beneath the initial dashboard graphical user interface based on at least a portion of the claim data associated with the one of the claims;
    executing, by the computing apparatus, integration of at least one additional claims processing application with the hierarchical claim management graphical user interface system based on one or more parameters related to the one of the plurality of claims to process the one of the plurality of claims; and
    providing, by the computing apparatus, computer executable instructions for at least a portion of the hierarchical claim management graphical user interface system.

2. The method as set forth in claim 1 wherein the customizing the configuration further comprises customizing the plurality of interactive panels to comprise two or more of:
    an adjuster case status panel comprising one or more of a number of assigned claims, a status of the assigned claims, or a list of recently reviewed claims;
    a monetary overview panel comprising one or more of a demand amount, offer range, or a current offer;
    a contact information panel comprising contact data for one or more of an insured, a claimant, or an attorney;
    a claim map panel comprising a map of one or more of an accident scene, a claimant address, an insured address, an attorney office address, or an insurance provider address; or
    a diary notes panel comprising one or more of adjuster notes, nurse notes, or key notes with a record of a date and time of each entry.

3. The method as set forth in claim 2 further comprising:
    executing, by the computing apparatus, one or more claim management operations based on the one of the plurality of claims and one or more of at least a portion of the retrieved claim data or one or more received data inputs from an adjuster computing device;
    wherein one of the one or more of claim management operations further comprise recording, by the computing apparatus, one or more status flag designations received from the adjustment computing device with an entry in the one of the plurality of specialized third-party claim management graphical user interfaces associated with the interactive diary notes panel.

4. The method as set forth in claim 2 wherein the retrieving claim data further comprises:
    retrieving, by the computing apparatus, one or more of a monetary range of pain and suffering or percentage of claimant liability and an insured liability via the automatic configuration to integrate with at least one additional insurance claim application; and
    updating, by the computing apparatus, the offer range in the initial dashboard graphical user interface and the one of the plurality of specialized third-party claim management graphical user interfaces associated with the monetary overview panel based on the retrieved one or more of a monetary range of pain and suffering or the percentage of claimant liability and an insured liability.

5. The method as set forth in claim 1 wherein the customizing the configuration further comprises nesting one or more sub-specialized third-party claim management graphical user interfaces nested below the at least one of the specialized third-party claim management graphical user interfaces.

6. The method as set forth in claim 5 wherein one of the one or more sub-specialized third-party claim management graphical user interfaces provides a recovery amount for each of the received one or more treatments based on a current position of one or more interactive treatment sliders along the timeline with a referenced expected recovery data and further comprising:
    receiving, by the computing apparatus, an adjustment data input indicating a change of position of one of the one or more interactive treatment sliders along the timeline for each of the received one or more treatments in the one of the one or more sub-specialized third-party claim management graphical user interfaces;
    recalculating, by the computing apparatus, the recovery amount for each of the received one or more treatments based on the changed position of the one of the one or more interactive treatment sliders; and
    updating, by the computing apparatus, the one of the one or more sub-specialized third-party claim management graphical user interfaces based on the recalculation of the recovery amount for each of the received one or more treatments.

7. The method as set forth in claim 6 further comprising:
    providing, by the computing apparatus, one or more guidelines for the received one or more treatments for the one of the plurality of claims;
    receiving, by the computing apparatus, a selection of one of the one or more guidelines; and
    updating, by the computing apparatus, the position of the one of the one or more interactive treatment sliders and the recovery amounts in the one or more sub-specialized third-party claim management graphical user interfaces based on the selected one of the one or more guidelines.

8. The method as set forth in claim 7 further comprising enabling, by the computing apparatus, entry of at least one new rule for selection for the updating the position of the one of the one or more interactive treatment sliders and the recovery amounts in the one or more sub-specialized third-party claim management graphical user interfaces.

9. The method as set forth in claim 5 wherein one of the one or more sub-specialized third-party claim management graphical user interfaces provides a current charged and an initial percentage rating against one or more benchmarks based on a current position of a charged amount slider and further comprising:
receiving, by the computing apparatus, an adjustment of the charged amount slider;
determining, by the computing apparatus, an updated percentage rating against the one or more benchmarks based on the adjusted position of the charged amount slider; and
updating, by the claim management computing apparatus, the one of the one or more sub-specialized third-party claim management graphical user interfaces based on the determination of the updated percentage rating against the one or more benchmarks.

10. The method as set forth in claim 5 further comprising capturing, by the computing apparatus, one or more snapshots of at least negotiation notes at a recorded point in time for the one of the plurality of claims, wherein one of the one or more sub-specialized third-party claim management graphical user interfaces provides the captured one or more snapshots.

11. The method as set forth in claim 5 wherein one of the one or more sub-specialized third-party claim management graphical user interfaces provides a negotiation worksheet comprising one or more degree of difficulty fields and one or more corresponding modifiable text fields relating to notes favoring claimant, notes which are neutral, and notes not favoring claimant and further comprising:
receiving, by the computing apparatus, one or more edits to one of the one or more degree of difficulty fields or one of the one or more corresponding modifiable text fields; and
recording, by the computing apparatus, the one or more edits to one of the one or more degree of difficulty fields or one of the one or more corresponding modifiable text fields in the one of the one or more sub-specialized third-party claim management graphical user interfaces provides the negotiation worksheet for subsequent request and retrieval.

12. The method as set forth in claim 5 wherein one of the one or more sub-specialized third-party claim management graphical user interfaces provides current modifiable medical edits for the for the one of the plurality of claims with at least a level of negotiation difficulty, a category, a number of edits, a short description, a purpose, and handling notes for each medical edit.

13. The method as set forth in claim 5 wherein one of the one or more sub-specialized third-party claim management graphical user interfaces provides medical charges by one or more providers with a charged amount and allowed amount for each of the one or more providers.

14. The method as set forth in claim 1 wherein the executing integration of the at least one additional claims processing application is further based on a current hierarchical level of the hierarchical claim management graphical user interface system.

15. A non-transitory computer readable medium having stored thereon instructions comprising executable code which when executed by a processor, causes the processor to perform steps comprising:
retrieving claim data associated with one of a plurality of claims from one or more storage databases;
customizing a configuration of at least a portion of a hierarchical claim management graphical user interface system comprising an initial dashboard graphical user interface comprising a plurality of interactive panels and a plurality of specialized third-party claim management graphical user interfaces nested beneath the initial dashboard graphical user interface based on at least a portion of the claim data associated with the one of the claims; and
executing integration of at least one additional claims processing application with the hierarchical claim management graphical user interface system based on one or more parameters related to the one of the plurality of claims to process the one of the plurality of claims; and
providing computer executable instructions for at least a portion of the hierarchical claim management graphical user interface system.

16. The medium as set forth in claim 15 wherein the customizing the configuration further comprises customizing the plurality of interactive panels to comprise two or more of:
an adjuster case status panel comprising one or more of a number of assigned claims, a status of the assigned claims, or a list of recently reviewed claims;
a monetary overview panel comprising one or more of a demand amount, offer range, or a current offer;
a contact information panel comprising contact data for one or more of an insured, a claimant, or an attorney;
a claim map panel comprising a map of one or more of an accident scene, a claimant address, an insured address, an attorney office address, or an insurance provider address; and
a diary notes panel comprising one or more of adjuster notes, nurse notes, or key notes with a record of a date and time of each entry.

17. The medium as set forth in claim 16 further comprising:
executing one or more claim management operations based on the one of the plurality of claims and one or more of at least a portion of the retrieved claim data or one or more received data inputs from an adjuster computing device;
wherein one of the one or more of claim management operations further comprise recording one or more status flag designations received from the adjustment computing device with an entry in the one of the plurality of specialized third-party claim management graphical user interfaces associated with the interactive diary notes panel.

18. The medium as set forth in claim 16 wherein the retrieving claim data further comprises:
retrieving one or more of a monetary range of pain and suffering or percentage of claimant liability and an insured liability via the automatic configuration to integrate with at least one additional insurance claim application; and
updating the offer range in the initial dashboard graphical user interface and the one of the plurality of specialized third-party claim management graphical user interfaces associated with the monetary overview panel based on the retrieved one or more of a monetary range of pain and suffering or the percentage of claimant liability and an insured liability.

19. The medium as set forth in claim 15 wherein the customizing the configuration further comprises nesting one or more sub-specialized third-party claim management graphical user interfaces nested below the at least one of the specialized third-party claim management graphical user interfaces.

20. The medium as set forth in claim 19 wherein one of the one or more sub-specialized third-party claim management graphical user interfaces provides a recovery amount for each of the received one or more treatments based on a current position of one or more interactive treatment sliders along the timeline with a referenced expected recovery data and further comprising:
   receiving an adjustment data input indicating a change of position of one of the one or more interactive treatment sliders along the timeline for each of the received one or more treatments in the one of the one or more sub-specialized third-party claim management graphical user interfaces;
   recalculating the recovery amount for each of the received one or more treatments based on the changed position of the one of the one or more interactive treatment sliders; and
   updating the one of the one or more sub-specialized third-party claim management graphical user interfaces based on the recalculation of the recovery amount for each of the received one or more treatments.

21. The medium as set forth in claim 20 further comprising:
   providing one or more guidelines for the received one or more treatments for the one of the plurality of claims;
   receiving a selection of one of the one or more guidelines; and
   updating the position of the one of the one or more interactive treatment sliders and the recovery amounts in the one or more sub-specialized third-party claim management graphical user interfaces based on the selected one of the one or more guidelines.

22. The medium as set forth in claim 21 further comprising enabling entry of at least one new rule for selection for the updating the position of the one of the one or more interactive treatment sliders and the recovery amounts in the one or more sub-specialized third-party claim management graphical user interfaces.

23. The medium as set forth in claim 19 wherein one of the one or more sub-specialized third-party claim management graphical user interfaces provides a current charged and an initial percentage rating against one or more benchmarks based on a current position of a charged amount slider and further comprising:
   receiving an adjustment of the charged amount slider;
   determining an updated percentage rating against the one or more benchmarks based on the adjusted position of the charged amount slider; and
   updating the one of the one or more sub-specialized third-party claim management graphical user interfaces based on the determination of the updated percentage rating against the one or more benchmarks.

24. The medium as set forth in claim 19 further comprising capturing one or more snapshots of at least negotiation notes at a recorded point in time for the one of the plurality of claims, wherein one of the one or more sub-specialized third-party claim management graphical user interfaces provides the captured one or more snapshots.

25. The medium as set forth in claim 19 wherein one of the one or more sub-specialized third-party claim management graphical user interfaces provides a negotiation worksheet comprising one or more degree of difficulty fields and one or more corresponding modifiable text fields relating to notes favoring claimant, notes which are neutral, and notes not favoring claimant and further comprising:
   receiving one or more edits to one of the one or more degree of difficulty fields or one of the one or more corresponding modifiable text fields; and
   recording the one or more edits to one of the one or more degree of difficulty fields or one of the one or more corresponding modifiable text fields in the one of the one or more sub-specialized third-party claim management graphical user interfaces provides the negotiation worksheet for subsequent request and retrieval.

26. The medium as set forth in claim 19 wherein one of the one or more sub-specialized third-party claim management graphical user interfaces provides current modifiable medical edits for the for the one of the plurality of claims with at least a level of negotiation difficulty, a category, a number of edits, a short description, a purpose, and handling notes for each medical edit.

27. The medium as set forth in claim 19 wherein one of the one or more sub-specialized third-party claim management graphical user interfaces provides medical charges by one or more providers with a charged amount and allowed amount for each of the one or more providers.

28. The medium as set forth in claim 15 wherein the executing integration of at least one additional claims processing application is further based on a current hierarchical level of the hierarchical claim management graphical user interface system.

29. A computing apparatus comprising:
   a processor; and
   a memory coupled to the processor which is configured to be capable of executing programmed instructions comprising and stored in the memory to:
      retrieve claim data associated with one of a plurality of claims from one or more storage databases;
      customize a configuration of at least a portion of a hierarchical claim management graphical user interface system comprising an initial dashboard graphical user interface comprising a plurality of interactive panels and a plurality of specialized third-party claim management graphical user interfaces nested beneath the initial dashboard graphical user interface based on at least a portion of the claim data associated with the one of the claims;
      execute integration of at least one additional claims processing application with the hierarchical claim management graphical user interface system based on one or more parameters related to the one of the plurality of claims to process the one of the plurality of claims; and
      provide computer executable instructions for at least a portion of the hierarchical claim management graphical user interface system.

30. The apparatus as set forth in claim 29 wherein the customize the configuration further comprises customizing the plurality of interactive panels to comprise two or more of:
   an adjuster case status panel comprising one or more of a number of assigned claims, a status of the assigned claims, or a list of recently reviewed claims;
   a monetary overview panel comprising one or more of a demand amount, offer range, or a current offer;

a contact information panel comprising contact data for one or more of an insured, a claimant, or an attorney;

a claim map panel comprising a map of one or more of an accident scene, a claimant address, an insured address, an attorney office address, or an insurance provider address; and a diary notes panel comprising one or more of adjuster notes, nurse notes, or key notes with a record of a date and time of each entry.

31. The apparatus as set forth in claim 30 wherein the processor coupled to the memory is further configured to be capable of executing at least one additional programmed instruction to:

execute one or more claim management operations based on the one of the plurality of claims and one or more of at least a portion of the retrieved claim data or one or more received data inputs from an adjuster computing device;

wherein one of the one or more of claim management operations further comprise recording one or more status flag designations received from the adjustment computing device with an entry in the one of the plurality of specialized third-party claim management graphical user interfaces associated with the interactive diary notes panel.

32. The apparatus as set forth in claim 30 wherein the processor coupled to the memory is further configured to be capable of executing at least one additional programmed instruction for the retrieve the claim data to:

retrieve one or more of a monetary range of pain and suffering or percentage of claimant liability and an insured liability via the automatic configuration to integrate with at least one additional insurance claim application; and update the offer range in the initial dashboard graphical user interface and the one of the plurality of specialized third-party claim management graphical user interfaces associated with the monetary overview panel based on the retrieved one or more of a monetary range of pain and suffering or the percentage of claimant liability and an insured liability.

33. The apparatus as set forth in claim 29 wherein the customize the configuration further comprises nesting one or more sub-specialized third-party claim management graphical user interfaces nested below the at least one of the specialized third-party claim management graphical user interfaces.

34. The apparatus as set forth in claim 33 wherein one of the one or more sub-specialized third-party claim management graphical user interfaces provides a recovery amount for each of the received one or more treatments based on a current position of one or more interactive treatment sliders along the timeline with a referenced expected recovery data and wherein the processor coupled to the memory is further configured to be capable of executing at least one additional programmed instruction comprising and stored in the memory to:

receive an adjustment data input indicating a change of position of one of the one or more interactive treatment sliders along the timeline for each of the received one or more treatments in the one of the one or more sub-specialized third-party claim management graphical user interfaces;

recalculate the recovery amount for each of the received one or more treatments based on the changed position of the one of the one or more interactive treatment sliders; and update the one of the one or more sub-specialized third-party claim management graphical user interfaces based on the recalculation of the recovery amount for each of the received one or more treatments.

35. The apparatus as set forth in claim 34 wherein the processor coupled to the memory is further configured to be capable of executing at least one additional programmed instruction comprising and stored in the memory to:

provide one or more guidelines for the received one or more treatments for the one of the plurality of claims;

receive a selection of one of the one or more guidelines; and update the position of the one of the one or more interactive treatment sliders and the recovery amounts in the one or more sub-specialized third-party claim management graphical user interfaces based on the selected one of the one or more guidelines.

36. The apparatus as set forth in claim 35 wherein the processor coupled to the memory is further configured to be capable of executing at least one additional programmed instruction comprising and stored in the memory to enable entry of at least one new rule for selection for the updating the position of the one of the one or more interactive treatment sliders and the recovery amounts in the one or more sub-specialized third-party claim management graphical user interfaces.

37. The apparatus as set forth in claim 33 wherein one of the one or more sub-specialized third-party claim management graphical user interfaces provides a current charged and an initial percentage rating against one or more benchmarks based on a current position of a charged amount slider and wherein the processor coupled to the memory is further configured to be capable of executing at least one additional programmed instruction comprising and stored in the memory to:

receive an adjustment of the charged amount slider;

determine an updated percentage rating against the one or more benchmarks based on the adjusted position of the charged amount slider; and update the one of the one or more sub-specialized third-party claim management graphical user interfaces based on the determination of the updated percentage rating against the one or more benchmarks.

38. The apparatus as set forth in claim 33 wherein the processor coupled to the memory is further configured to be capable of executing at least one additional programmed instruction comprising and stored in the memory to capture one or more snapshots of at least negotiation notes at a recorded point in time for the one of the plurality of claims, wherein one of the one or more sub-specialized claim management graphical user interfaces provides the captured one or more snapshots.

39. The apparatus as set forth in claim 33 wherein one of the one or more sub-specialized third-party claim management graphical user interfaces provides a negotiation worksheet comprising one or more degree of difficulty fields and one or more corresponding modifiable text fields relating to notes favoring claimant, notes which are neutral, and notes not favoring claimant and wherein the processor coupled to the memory is further configured to be capable of executing at least one additional programmed instruction comprising and stored in the memory to:

receive one or more edits to one of the one or more degree of difficulty fields or one of the one or more corresponding modifiable text fields; and record the one or more edits to one of the one or more degree of difficulty fields or one of the one or more corresponding modifiable text fields in the one of the one or more sub-specialized third-party claim management graphical user interfaces provides the negotiation worksheet for subsequent request and retrieval.

40. The apparatus as set forth in claim 33 wherein one of the one or more sub-specialized third-party claim management graphical user interfaces provides current modifiable medical edits for the for the one of the plurality of claims with at least a level of negotiation difficulty, a category, a number of edits, a short description, a purpose, and handling notes for each medical edit.

41. The apparatus as set forth in claim 33 wherein one of the one or more sub-specialized third-party claim management graphical user interfaces provides medical charges by one or more providers with a charged amount and allowed amount for each of the one or more providers.

42. The apparatus as set forth in claim 29 wherein for the execute integration of at least one additional claims processing application the processor coupled to the memory is further configured to be capable of executing at least one additional programmed instruction comprising and stored in the memory to execute integration of the at least one additional claims processing application further based on a current hierarchical level of the hierarchical claim management graphical user interface system.

* * * * *